(12) United States Patent
Wada

(10) Patent No.: US 7,952,623 B2
(45) Date of Patent: May 31, 2011

(54) SOLID STATE IMAGING DEVICE AND IMAGE PICKUP APPARATUS

(75) Inventor: Tetsu Wada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 425 days.

(21) Appl. No.: 11/709,762

(22) Filed: Feb. 23, 2007

(65) Prior Publication Data

US 2007/0206110 A1    Sep. 6, 2007

(30) Foreign Application Priority Data

Feb. 23, 2006 (JP) ............................. P2006-047079
Feb. 13, 2007 (JP) ............................. P2007-032144

(51) Int. Cl.
    H04N 5/335        (2006.01)
(52) U.S. Cl. .................. 348/273; 348/272; 348/234
(58) Field of Classification Search .................. 359/575; 348/279, 272–277; 257/440
    See application file for complete search history.

(56) References Cited

U.S. PATENT DOCUMENTS

| | | | | |
|---|---|---|---|---|
| 5,323,233 | A * | 6/1994 | Yamagami et al. | 348/277 |
| 5,844,290 | A * | 12/1998 | Furumiya | 257/432 |
| 6,714,243 | B1 * | 3/2004 | Mathur et al. | 348/273 |
| 6,831,692 | B1 * | 12/2004 | Oda | 348/315 |
| 7,400,332 | B2 * | 7/2008 | Schweng et al. | 345/589 |
| 2002/0075391 | A1 * | 6/2002 | Shizukuishi | 348/319 |
| 2003/0011693 | A1 * | 1/2003 | Oda | 348/272 |
| 2003/0086008 | A1 * | 5/2003 | Nagano | 348/272 |
| 2003/0202113 | A1 * | 10/2003 | Yoshikawa | 348/272 |
| 2003/0222262 | A1 * | 12/2003 | Oda et al. | 257/72 |
| 2004/0046883 | A1 * | 3/2004 | Suzuki | 348/315 |
| 2004/0051790 | A1 * | 3/2004 | Tamaru et al. | 348/223.1 |
| 2005/0062863 | A1 * | 3/2005 | Takeuchi et al. | 348/272 |
| 2005/0225655 | A1 * | 10/2005 | Suzuki | 348/272 |
| 2005/0248667 | A1 * | 11/2005 | Schweng et al. | 348/234 |
| 2006/0044427 | A1 * | 3/2006 | Hu | 348/266 |
| 2006/0119724 | A1 * | 6/2006 | Inuiya | 348/311 |
| 2007/0153099 | A1 * | 7/2007 | Ohki et al. | 348/234 |
| 2008/0012969 | A1 * | 1/2008 | Kasai et al. | 348/266 |
| 2008/0030603 | A1 * | 2/2008 | Masuno et al. | 348/273 |

FOREIGN PATENT DOCUMENTS

EP        809124  A2 *  11/1997
(Continued)

*Primary Examiner* — David L Ometz
*Assistant Examiner* — Dwight Alex C Tejano
(74) *Attorney, Agent, or Firm* — Birch, Stewart, Kolasch & Birch, LLP

(57) ABSTRACT

A solid state imaging device comprises: a semiconductor substrate; and a plurality of photoelectric conversion elements arranged on the semiconductor substrate in a row direction and a column direction substantially perpendicular to the row direction, wherein said plurality of photoelectric conversion elements are divided to first and second groups, when positions of the photoelectric conversion elements of the second group are considered as reference positions, the photoelectric conversion elements of the first group are disposed at positions shifted in a given direction from the reference positions in such a manner that each of the photoelectric conversion elements of the first group adjoins the each of the photoelectric conversion elements of the second group, spectral filters are respectively provided upwardly of light receiving surfaces of the photoelectric conversion elements of the first group, the spectral filters comprising three or more kinds of spectral filters respectively transmitting different color components, and luminance filters are respectively provided upwardly of light receiving surfaces of the photoelectric conversion elements of the second group, the luminance filters each having a spectral characteristic correlated with luminance component of the light.

3 Claims, 4 Drawing Sheets

FOREIGN PATENT DOCUMENTS

| | | |
|---|---|---|
| JP | 4-88785 A | 3/1992 |
| JP | 11-355790 A | 12/1999 |
| JP | 2002-135792 A | 5/2002 |
| JP | 2003-244712 A | 8/2003 |
| JP | 2004-55786 A | 2/2004 |
| JP | 2007-214832 A | 8/2007 |

* cited by examiner

SOLID STATE IMAGING DEVICE AND IMAGE PICKUP APPARATUS

BACKGROUND OF THE INVENTION

1. Field of the Invention

The present invention relates to a solid state imaging device which includes a large number of photoelectric conversion elements arranged on a semiconductor substrate regularly in the row and column directions of the semiconductor substrate according to a previously set arrangement pattern respectively for detecting color components such as R (red), G (green) and B (blue).

2. Description of the Related Art

In a solid state imaging device which is employed in an apparatus such as a digital camera, in order to detect the image of a subject by every pixel of a two-dimensional image, a large necessary number of photoelectric conversion elements (generally, photodiodes) are two-dimensionally arranged in a tetragonal lattice manner. Also, in order to photograph a color image, generally, two or more photoelectric conversion elements respectively correlated with the respective colors, that is, R, G and B are regularly arranged in a two-dimensional manner in row and column directions according to a specific arrangement pattern.

Actually, to optimize the quality of a color image obtained by photographing, generally, two or more photoelectric conversion elements respectively correlated with the respective colors, that is, R, G and B are arranged according to a specific arrangement pattern called the Bayer arrangement pattern. Also, the characteristics of the colors to be detected by the respective photoelectric conversion elements are generally determined using color filters which are arranged on the front surfaces of the light receiving surfaces of the photoelectric conversion elements. That is, an optical filter transmitting only the R, an optical filter transmitting only the G and an optical filter transmitting only the B are arranged on the front surfaces of the light receiving surfaces of the respective photoelectric conversion elements according to the Bayer arrangement. When the optical filters are used, elements having the same characteristics can be used as the photoelectric conversion elements of the respective colors.

In the related art, for example, as disclosed in the JP-A-2004-055786, photoelectric conversion elements each having low detect sensitivity arranged in a tetragonal lattice manner and photoelectric conversion elements each having high detect sensitivity arranged in a tetragonal lattice manner are respectively arranged on a silicone substrate at mutually adjoining and shifted positions, thereby forming a honeycomb-shaped arrangement pattern.

The term "detect sensitivity of a photoelectric conversion element" means the characteristic of the photoelectric conversion element as to the quantity of signals that can be taken out from the photoelectric conversion element when a given quantity of light enters the photoelectric conversion element. In other words, a photoelectric conversion element having relatively high detect sensitivity can be defined such that, when the same quantity of light enters, it has a characteristic to be able to provide a larger quantity of signals than a photoelectric conversion element having relatively low detect sensitivity. Since the photoelectric conversion element having high sensitivity is able to provide a large quantity of signals with a small quantity of light, it is best suitable for photographing a subject of low luminance; however, when a large quantity of light enters, signals are saturated soon and, therefore, it is not suitable to photograph a subject of high luminance. Also, since the photoelectric conversion element having low detect sensitivity is not able to provide a large number of signals even when a large quantity of light enters, it is best suitable for photographing a subject of high luminance; however, when a small quantity of light enters, the quantity of signals to be provided by the element are too small and, therefore, it is not suitable to photograph a subject of low luminance.

In the above-structured solid state-imaging device, since, for every pixel to be detected, the photoelectric conversion element having low sensitivity and photoelectric conversion element having high sensitivity can be used at the same time, the light having a large quantity of light is detected by the photoelectric conversion element having low sensitivity and the light having a small quantity of light is detected by the photoelectric conversion element having high sensitivity, whereby the dynamic range of the image pickup characteristic of the solid state imaging device can be widened.

JP-A-11-355790 discloses arranging, on a silicon substrate, a first photosensitive element group formed by photosensitive elements for detecting a luminance component, arranged in a tetragonal lattice manner, and a second photosensitive element group formed by photosensitive elements for detecting a luminance component and photosensitive elements of two kinds for detecting respectively different color hue components, arranged in a tetragonal lattice manner, in shifted positions adjacent with each other, thereby forming a honeycomb-shaped arrangement pattern.

In a general solid state imaging device, there is employed a structure in which, in order to enhance the detect sensitivity of the respective photoelectric conversion elements, the light receiving areas of the respective photoelectric elements are set large, a micro lens is disposed on the front surface of the light receiving surface of each of the photoelectric conversion elements, whereby a larger quantity of light is allowed to enter the photoelectric conversion elements. However, when the number of photoelectric conversion elements is increased in order to enhance the resolution of the image to be photographed, the light receiving area of each photoelectric conversion element must be reduced, which makes it difficult to enhance the detect sensitivity of each photoelectric conversion element.

Especially, in the case of a solid state imaging device to photograph a color image, in order to detect the lights of the respective color components divided to R, G, B and the like, it is necessary to provide light dividing optical filters on the front surfaces of the receiving surfaces of the respective photoelectric conversion elements. However, because the transmittance of such optical filters is relatively low, the intensity of the light, which passes through the optical filters and is actually received by the photoelectric conversion elements, is attenuated, so that the sensitivity of the photoelectric conversion elements is lowered.

Suppose the sensitivity of the respective photoelectric conversion elements is low, for example, when a subject is photographed in a dark environment, a clear image cannot be obtained. Also, as disclosed in the JP-A-2004-055786, when, in a solid state imaging device, a photoelectric conversion element having low sensitivity and a photoelectric conversion element having high sensitivity are arranged at mutually adjoining positions, a signal of the photoelectric conversion element having low sensitivity and a signal of the photoelectric conversion element having high-sensitivity are combined together to thereby be able to broaden the dynamic range of the image pickup characteristic with respect to the brightness of the image; however, since the photoelectric conversion element having high sensitivity is easy to be influenced by the attenuation of the light due to the optical filter, the broadening effect of the dynamic range is reduced slightly.

Also in the combination of the detection wavelengths of the photosensitive elements employed for the first photosensitive element group and the second photosensitive element group as described in JP-A-11-355790, it is difficult to attain the color reproducibility and the improvement in sensitivity at the same time.

SUMMARY OF THE INVENTION

The present invention is made in view of the above circumstances. Thus, it is an object of the invention to provide a solid state imaging device which can achieve an improvement in the color reproducibility, an improvement in the sensitivity and a broadening in the dynamic range.

A solid state imaging device according to the invention is a solid state imaging device comprising: a semiconductor substrate; and a plurality of photoelectric conversion elements arranged on the semiconductor substrate in a row direction and a column direction substantially perpendicular to the row direction, wherein said plurality of photoelectric conversion elements are divided to first and second groups, when positions of the photoelectric conversion elements of the second group are considered as reference positions, the photoelectric conversion elements of the first group are disposed at positions shifted in a given direction from the reference positions in such a manner that each of the photoelectric conversion elements of the first group adjoins the each of the photoelectric conversion elements of the second group, spectral filters are respectively provided upwardly of light receiving surfaces of the photoelectric conversion elements of the first group, the spectral filters comprising three or more kinds of spectral filters respectively transmitting different color components, and luminance filters are respectively provided upwardly of light receiving surfaces of the photoelectric conversion elements of the second group, the luminance filters each having a spectral characteristic correlated with luminance component of the light.

In the solid state imaging device of the present invention, the photoelectric conversion elements of the first group has a detect sensitivity lower than that of the photoelectric conversion elements of the second group.

In the solid state imaging device of the present invention, the photoelectric conversion elements of the first group has a detect sensitivity approximately same as that of the photoelectric conversion elements of the second group.

In the solid state imaging device of the present invention, the solid state imaging device further comprises microlenses provided upwardly of the respective photoelectric conversion elements of the first and second groups, wherein the spectral filters have a larger size than that of the luminance filters, and microlenses provided upwardly of the respective photoelectric conversion elements of the first group have a larger size than that of microlenses provided upwardly of the respective photoelectric conversion elements of the second group.

In the solid state imaging device of the present invention, the three or more kinds of spectral filters are three kinds of spectral filters, and the three kinds of spectral filters are provided in a proportion of 2:1:1.

In the solid state imaging device of the present invention, the three kinds of spectral filters comprises spectral filters respectively transmitting a red light, spectral filters respectively transmitting a green light and spectral filters respectively transmitting a blue light, and the three kinds of spectral filters are arranged in the Bayer arrangement manner.

In the solid state imaging device of the present invention, the photoelectric conversion elements of the first group and the photoelectric conversion elements of the second group have a same arrangement pattern, and the arrangement pattern is a lattice-like pattern.

The solid state imaging device of the present invention is so constructed that signals can be read independently from each of the photoelectric conversion elements of the first group and the photoelectric conversion elements of the second group.

An image pickup apparatus according to the invention comprises: the above-mentioned solid state imaging device; a movable lens disposed in front of the solid state imaging device; and, a focusing section that adjusts a focal position of the lens according to a signal from the solid state imaging device, wherein the focusing section, when it is driven by the solid state imaging device in order to adjust the focal position, reads a signal only from the respective photoelectric conversion elements of the second group provided in the solid state imaging device.

DETAILED DESCRIPTION OF THE INVENTION

Figure 1:
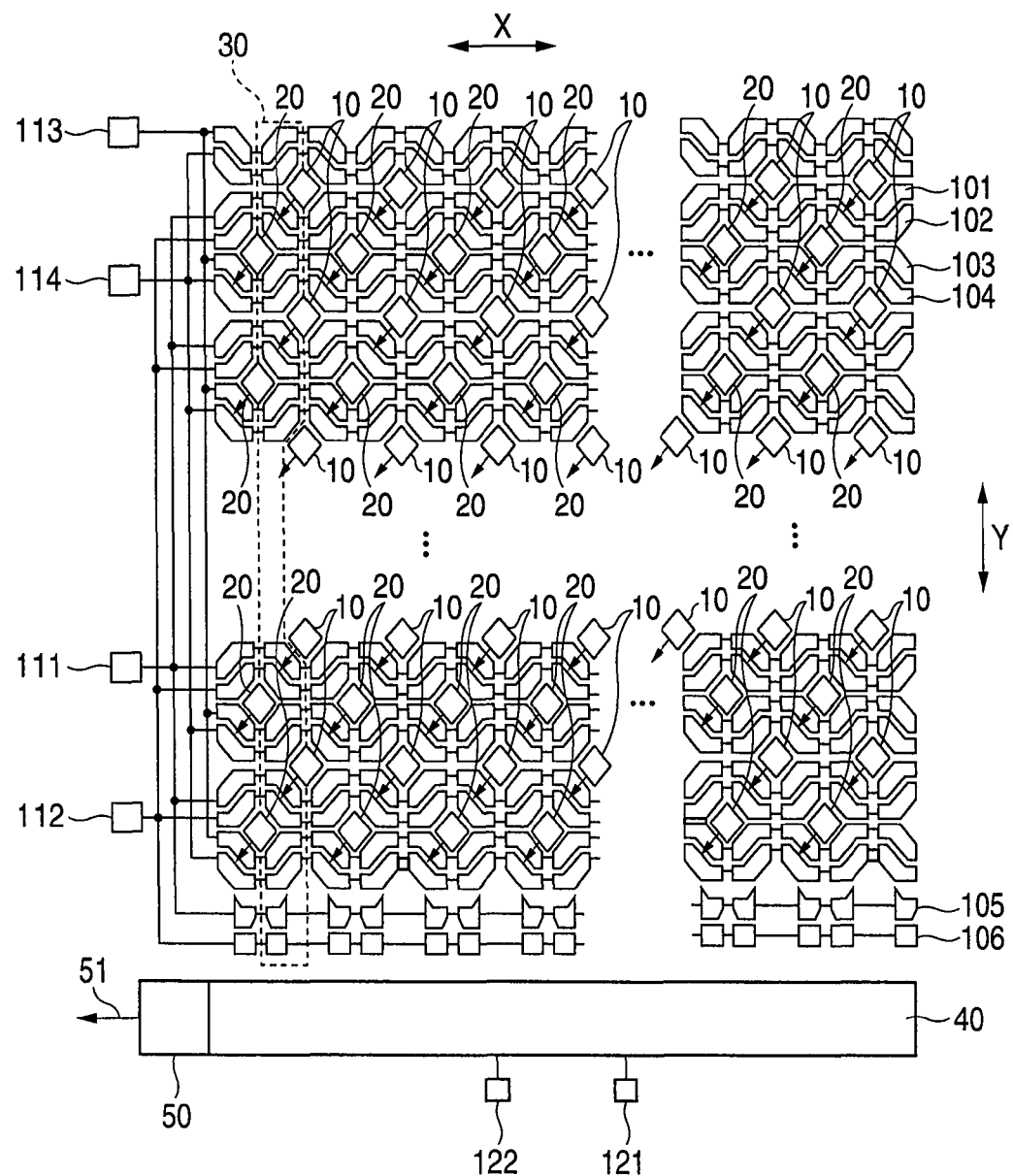
FIG. 1 is a typical plan view of the schematic structure of a solid state imaging device according to an embodiment of the invention.

FIG. 1 is a typical plan view of the schematic structure of a solid state imaging device according to an embodiment of the invention.

The solid state imaging device shown in FIG. 1 comprises: a large number of low sensitivity photoelectric conversion elements 10 each having relatively low detect sensitivity and the same number of high sensitivity photoelectric conversion elements 20 each having relatively high detect sensitivity arranged on a silicone substrate in the row direction X of the silicone substrate and in the column direction Y thereof intersecting at right angles to the row direction X; a vertical charge transfer part (VCCD) 30 (in FIG. 1, the reference numeral is given only to a portion thereof) for transferring electric charges stored in the low sensitivity photoelectric conversion elements 10 and high sensitivity photoelectric conversion elements 20 in the column direction Y; a horizontal charge transfer part (HCCD) 40 for transferring the electric charges, which have been transferred through the VCCD 30, in the row direction X; and, a signal output part 50 for outputting a voltage signal corresponding to the electric charges transferred through the HCCD 40. Here, the photoelectric conversion element is, for example, a photodiode and thus the photoelectric conversion element is hereinafter abbreviated to PD.

The low sensitivity PDs 10 and high sensitivity PDs 20 are respectively arranged in the row direction X and in the column direction Y intersecting at right angles to the row direction X in a tetragonal lattice manner. The arrangement pitch of the low sensitivity PD 10 and the arrangement pitch of the high sensitivity PD 20 are the same, while the low and high sensitivity PDs 10 and are arranged at positions which are respectively shifted by half of the arrangement pitch in the row direction X and in the column direction Y with respect to each other. To change the detect sensitivity of the low and high sensitivity PDs 10 and 20, the area of the light receiving surface of the PD may be varied, or the focusing area thereof may be varied using a micro lens disposed upwardly of the PDs, or the exposure times of the low and high sensitivity PDs may be set different from each other. These methods are known well and thus the description thereof is omitted here.

Upwardly of the light receiving surfaces of the large number of low sensitivity PDs 10, there are provided three kinds of spectral filters which respectively transmit different color components (here, the color components are considered as R, G and B).

Upwardly of the light receiving surfaces of the large number of high sensitivity PDs 20, there are provided luminance filters each having a spectral characteristic correlated with the luminance component of the light. As the luminance filter, there can be used an ND filter, a transparent filter, a white filter, a grey filter or the like. Here, when there is employed a structure in which nothing is provided upwardly of the light receiving surfaces of the large number of high sensitivity PDs 20 and the light is allowed to enter the light receiving surfaces directly, such structure can be said to be equivalent to the provisions of the luminance filter. The luminance filter can transmit the light of many wavelength components and thus the attenuation of the light by the luminance filter is less than the attenuation of the light by the spectral filter.

The VCCD 30 includes a vertical transfer channel (not shown) formed on the silicone substrate, two or more vertical transfer electrodes 101~104 formed so as to cross the vertical transfer channel when viewed on the plan view thereof, and a charge read area (in FIG. 1, it is typically shown by an arrow mark) for reading the electric charges of the low and high sensitivity PDs 10 and 20 into the vertical transfer channel.

The vertical transfer channel has such a meandering shape that it extends in the column direction Y as a whole between the low and high sensitivity PDs 10 and 20; and, the vertical transfer channel is divided to an electrode storage area and an electrode transfer areas by the vertical transfer electrodes 101~104 provided upwardly of the vertical transfer channel. The four vertical transfer electrodes 101~104 are provided so as to respectively correspond to the low and high sensitivity PDs 10 and 20 (in FIG. 1, the reference character is applied only to the high sensitivity PDs contained in one row), while the vertical transfer electrodes show such a meandering shape in which they extend as a whole in the row direction X between the low and high sensitivity PDs 10 and 20.

To the vertical transfer electrodes 101~104, there are applied four phase vertical transfer pulses through terminals 111~114, whereby the electric charges of the vertical transfer channel are transferred in the column direction Y. The vertical transfer pulses are also applied to transfer electrodes 105 and 106 interposed between the VCCD 30 and HCCD 40, whereby electric charges detected by the low and high sensitivity PDs 10 and 20 contained in one row are transmitted to the HCCD 40 every cycle of the vertical transfer pulses. The reading of the electric charges from the low and high sensitivity PDs 10 and 20 to the vertical transfer channel is carried out by superimposing read pulses on a first phase pulse (a vertical transfer pulse to be applied to the terminal 111) just after start of the vertical charge transfer and a third phase pulse (a vertical transfer pulse to be applied to the terminal 113).

An electrode used to apply the read pulse to the charge read area corresponding to the low sensitivity PDs 10 (which is hereinafter referred to as a PD 10 charge read electrode) is the vertical transfer electrode 101. And, an electrode used to apply the read pulse to the charge read area corresponding to the high sensitivity PDs 20 (which is hereinafter referred to as a PD 20 charge read electrode) is the vertical transfer electrode 103.

In the solid state imaging device shown in FIG. 1, the electrode for reading the electric charge of the low sensitivity PD 10 and the electrode for reading the electric charge of the high sensitivity PD 20 are respectively connected to the different terminals (111, 113). Thanks to this, by controlling the read pulses to be applied to the terminals 111 and 113, the electric charge of the high sensitivity PD 20 and the electric charge of the low sensitivity PD 10 can be read individually or simultaneously.

The HCCD 40 includes a horizontal transfer channel (not shown) formed within the silicone substrate and a horizontal transfer channel (not shown) formed upwardly of the horizontal transfer channel. To the horizontal transfer electrode, there are applied two phase horizontal transfer pulses through terminals 121 and 122, whereby electric charges from the low sensitivity PDs 10 contained in one row and electric charges from the high sensitivity PDs 20 contained in one row, both of which have been transferred from the VCCD 30, are transferred to the signal output part 50.

In the thus structured solid state imaging device, electric charges stored in the low and high sensitivity PDs 10 and 20 according to the intensity of the incident light from a subject field are read to the vertical transfer channel by the read pulses superimposed on the first phase and third phase vertical pulses. And, the electric charges are transferred through the vertical transfer channel according to the vertical transfer pulses and are then held in a given area of the horizontal transfer channel. Next, when the horizontal transfer pulse is applied, the thus held electric charges are sequentially transmitted to the signal output part 50, whereby a voltage signal 51 corresponding to the quantity of the electric charges is output.

Figure 2:
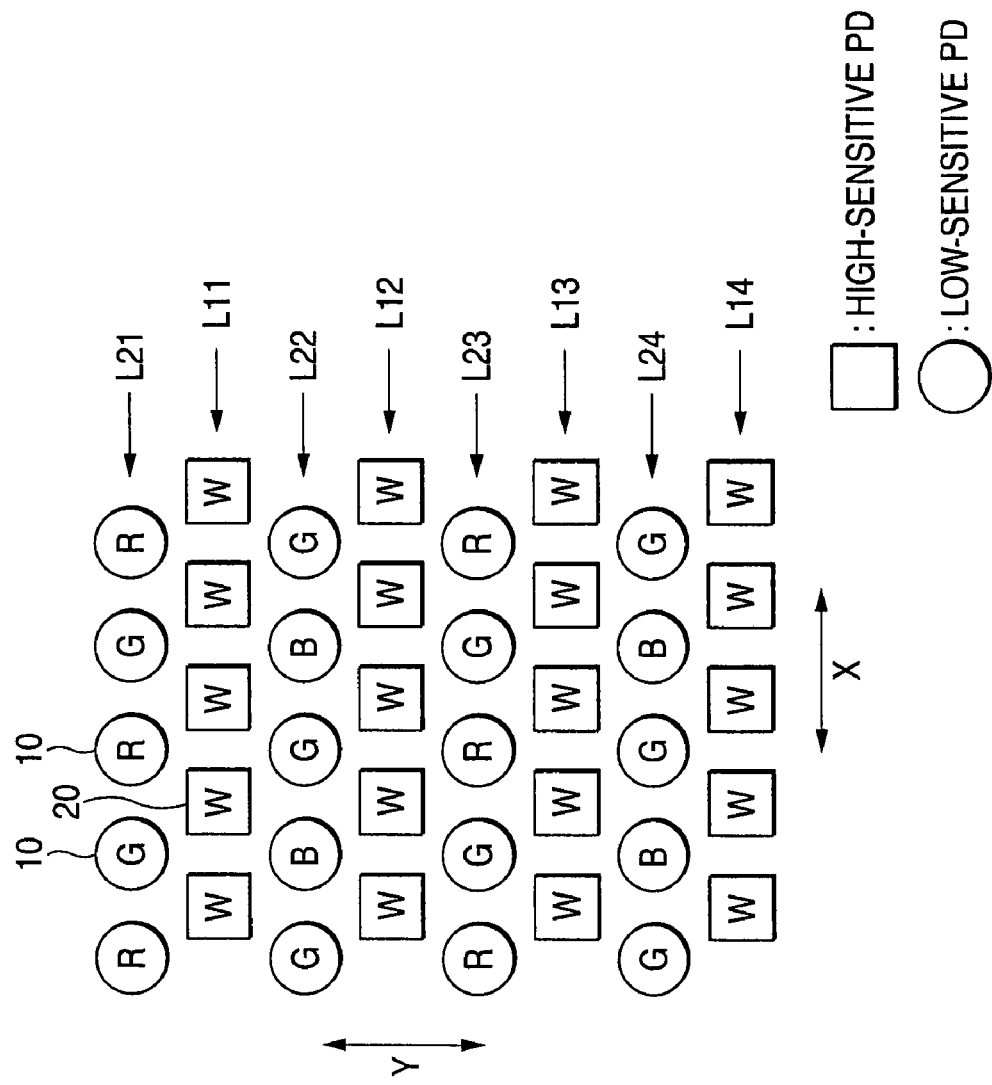
FIG. 2 is a typical plan view of the arrangement pattern of photoelectric conversion elements included in the solid state imaging device shown in FIG. 1.

Next description will be given below of the specific pattern of the above-mentioned low and high sensitivity PDs 10 and 20 with reference to FIG. 2. In FIG. 2, for the purpose of explanation, there are shown only the low and high sensitivity PDs 10 and 20 which respectively correspond to "four rows× five columns". Also, in FIG. 2, the low sensitivity PDs 10 are shown in the form of circular figures, whereas the high sensitivity PDs 20 are shown in the form of square figures. Further, within the respective square and circular figures, there are written the color components to be detected by the respective PDs in the form of R, G, B, and W. Since the luminance filter transmits all of the color components R, G and B, the color component to be detected by the high sensitivity PD 20 including a luminance filter thereon is expressed by "W" which expresses a white color.

In other words, in FIG. 2, for the PD expressed by "R", upwardly of this PD, there is provided a spectral filter which transmits the "R" component; for the PD expressed by "G", upwardly of this PD, there is provided a spectral filter which transmits the "G" component; for the PD expressed by "B", upwardly of this PD, there is provided a spectral filter which transmits the "B" component; and, for the PD expressed by "W", upwardly of this PD, there is provided a luminance filter.

As shown in FIG. 2, the low sensitivity PDs 10 are respectively arranged in rows L21, L22, L23, L24, - - - , while the high sensitivity PDs 20 are respectively arranged in rows L11, L12, L13, L14, - - - .

As regards the group of the low sensitivity PDs 10, in the first row L21, there are arranged regularly the low sensitivity PDs 10 which respectively detect the color components "R", "G", "R", "G", "R", - - - ; in the second row L22, there are arranged regularly the low sensitivity PDs 10 which respectively detect the color components "G", "B", "G", "B", "G", - - - ; in the third row L23, similarly to the first row L21, there are regularly arranged the low sensitivity PDs 10; and, in the fourth row L24, similarly to the second row L22, there are regularly arranged the low sensitivity PDs 10. That is, the RGB spectral filters provided upwardly of the large number of low sensitivity PDs 10 are arranged in the well-known Bayer arrangement manner.

As regards the group of the high sensitivity PDs 20, in all rows L11, L12, L13, L14, - - - , there are arranged the high sensitivity PDs 20 which detect the luminance components.

In this manner, since, upwardly of the high sensitivity PDs 20, there are present the luminance filters the light attenuation of which is smaller than that of the spectral filters, the detect sensitivity of the high sensitivity PDs 20 can be enhanced when compared with the related-art structure in which the spectral filters are provided upwardly of the respective high sensitivity PDs 20.

Also, the combined use of the low and high sensitivity PDs 10 and 20 disposed at mutually adjoining positions makes it possible to reproduce an image signal having a wide dynamic range. That is, by photographing an image using the high sensitivity PDs 20, even for the weal light, it is possible to reproduce a clear image which can overcome the noise; and, by photographing using the low sensitivity PDs 10, even for the strong light, the intensity of the light can be reproduced faithfully without causing the saturation of the signal. Particularly in the present embodiment, a further improvement in the dynamic range can be expected, since the detection sensitivity of the high-sensitivity PD 20 is further improved by providing the luminance filter.

Also in the PD arrangement in the entire solid state imaging device, a high resolution can be obtained since PDs capable detecting the luminance component are present in each row and in each column.

Also the group of low sensitivity PDs 10 include PDs for detecting R light, PDs for detecting G light and PDs for detecting B light, which can be read out simultaneously, so that the accumulation times of the respective PDs belonging to the group of low sensitivity PD 10 can be made completely same, by an electronic shutter control. Therefore, in comparison with a case of utilizing different charge read electrodes for the PDs for detecting R light, PDs for detecting G light and PDs for detecting B light, there can be reduced a cost necessary for regulating the accumulation times.

Also, since each of the low sensitivity PDs 10 and the high sensitivity PDs 20 are arranged in a tetragonal lattice pattern, in case of a curtailed signal reading from either only, a color image can be prepared by the signals only from the low sensitivity PDs 10 while a high-definition black-and-white image can be obtained by the signals only from the high sensitivity PDs 20. Also by making the detect sensitivity of the low sensitivity PDs 10 and the high sensitivity PDs 20 controllable by the exposure time, an imaging operation can be executed with a sensitivity matching the environment of imaging, even in case of curtailed reading.

In the present embodiment, a difference in the detect sensitivity is provided by a known method between the low sensitivity PDs 10 and the high sensitivity PDs 20, but the low sensitivity PDs 10 and the high sensitivity PDs 20 may be formed by photodiodes of a same structure, having a same light receiving area, a same exposure time and a same light condensing area of the microlens provided upward. Even in such case, because a spectral filter is provided above the low sensitivity PD 10 while a luminance filter, having less light attenuation than in the spectral filter, is provided above the high sensitivity PD 20, the detect sensitivity of the high sensitivity PD 20 becomes eventually higher than that of the low sensitivity PD 10. Therefore, an imaging operation can be executed with a broadened dynamic range in comparison with the case of identical detect sensitivities.

Figure 4:
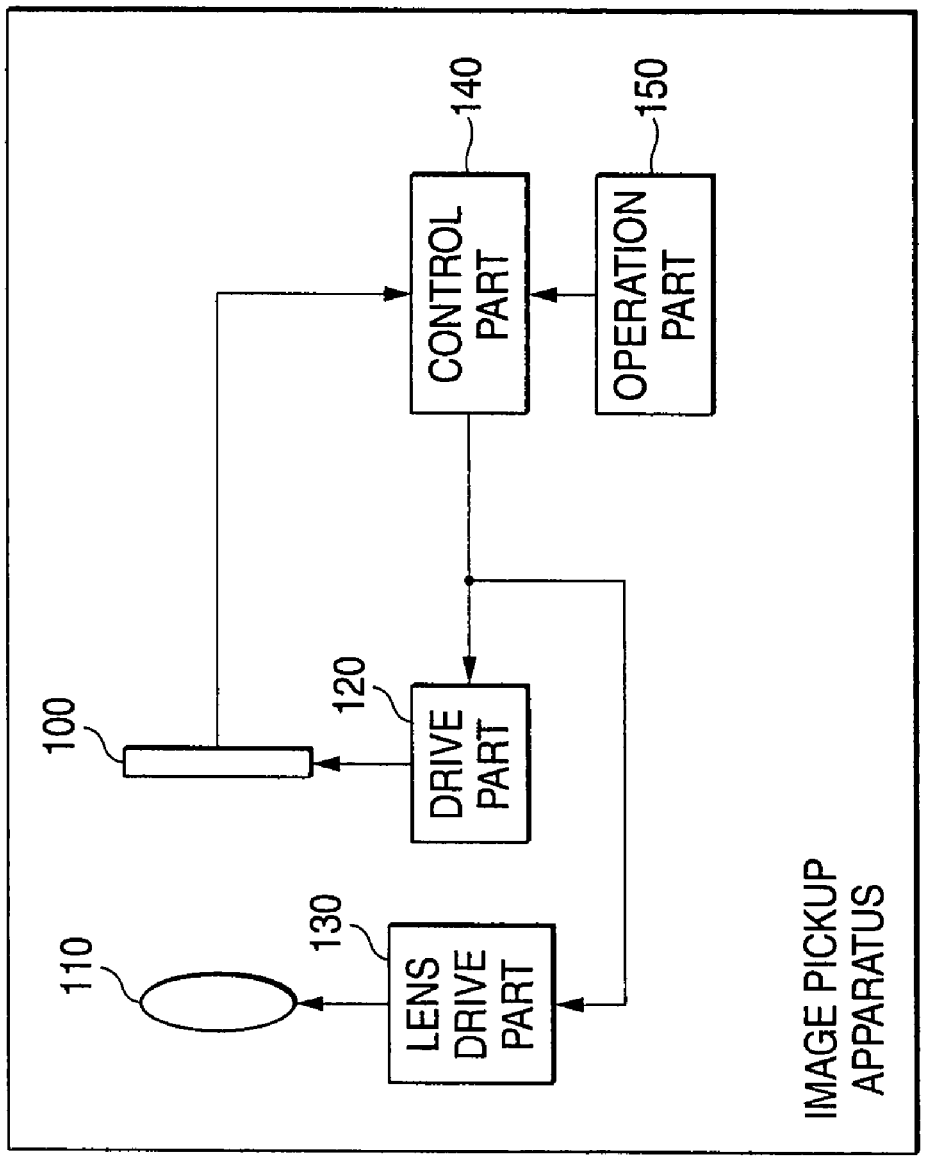
FIG. 4 is a block diagram of the schematic structure of an image pickup apparatus incorporating therein the solid state imaging device shown in FIG. 1.

Also in the case that low sensitivity PDs 10 and the high sensitivity PDs 20 are formed by photodiodes of a same structure, the structure becomes similar to the imaging device shown in FIG. 4 of JP-A-11-355790. However, in the imaging device in FIG. 4 of JP-A-11-355790, a spectral filter transmitting G light has to be provided on the photosensitive element for detecting the luminance component, so that the detect-sensitivity is lowered a in the photosensitive elements for detecting the luminance component. On the other hand, in the solid state imaging device of the present embodiment, the detect sensitivity for the luminance component can be improved in comparison with the imaging device of JP-A-11-355790, as a luminance filter, showing less light attenuation than in the spectral filter, is provided upwardly of the high sensitivity PD 20.

Also in the case that low sensitivity PDs 10 and the high sensitivity PDs 20 are formed by photodiodes of a same structure, the structure becomes similar to the imaging device shown in FIG. 1 of JP-A-11-355790. However, the imaging device in FIG. 1 of JP-A-11-355790 can only provide signals of 3 kinds, namely Y signal, C1 signal and C2 signal in the imaging operation, thus leading to a deteriorated color reproducibility. In contrast, the solid state imaging device of the present embodiment can provide signals of 4 kinds, namely R signal, G signal, B signal and a luminance signal, and is capable of improving the color reproducibility in comparison with the imaging device of JP-A-11-355790.

Here, according to the structure shown in FIG. 2, when an adding processing is executed on the electric charges by the HCCD 40 in order to reduce the resolution about the row direction X down to a half, for the respective rows of the low sensitivity PDs 10, electric charges obtained from the low sensitivity PDs 10 for detecting the same color components adjoining every other component in the row direction X are added together; and, for the respective rows of the high sensitivity PDs 20, electric charges obtained from the high sensitivity PDs 20 for detecting the same color components adjoining each other in the row direction X are added together. Assuming that the Bayer arrangement spectral filters are present upwardly of the high sensitivity PDs 20 as in the related-art structure, for the respective rows of the high sensitivity PDs 20 as well, it is necessary to add together the electric charges obtained from the high sensitivity PDs 20 for detecting the same color components adjoining every other component in the row direction X. In this case, the adding processing on the electric charges from the low sensitivity PDs 10 and the adding processing on the electric charges from the high sensitivity PDs 20 cannot be carried out at the same time. On the other hand, according to the structure shown in FIG. 2, the adding processing on the electric charges from the low sensitivity PDs 10 and the adding processing on the electric charges from the high sensitivity PDs 20 can be carried out at the same time, thereby being able to execute the adding processings at an enhanced speed.

In the solid state imaging device described above, the detect sensitivity is made higher in the high sensitivity PDs 20 than in the low sensitivity PDs 10 in order to broaden the dynamic range, but, in such case, a large difference is generated between the quantity of signal obtained from the low sensitivity PD 10 and the quantity of signal obtained from the high sensitivity PD 20, so that the signal reading process and the signal processing after signal reading become complex. Therefore, in the solid state imaging device of FIG. 1, the signal processing can be simplified by selecting the detect sensitivity of the high sensitivity PDs 20 approximately same as the detect sensitivity of the low sensitivity PDs 10.

Figure 3:
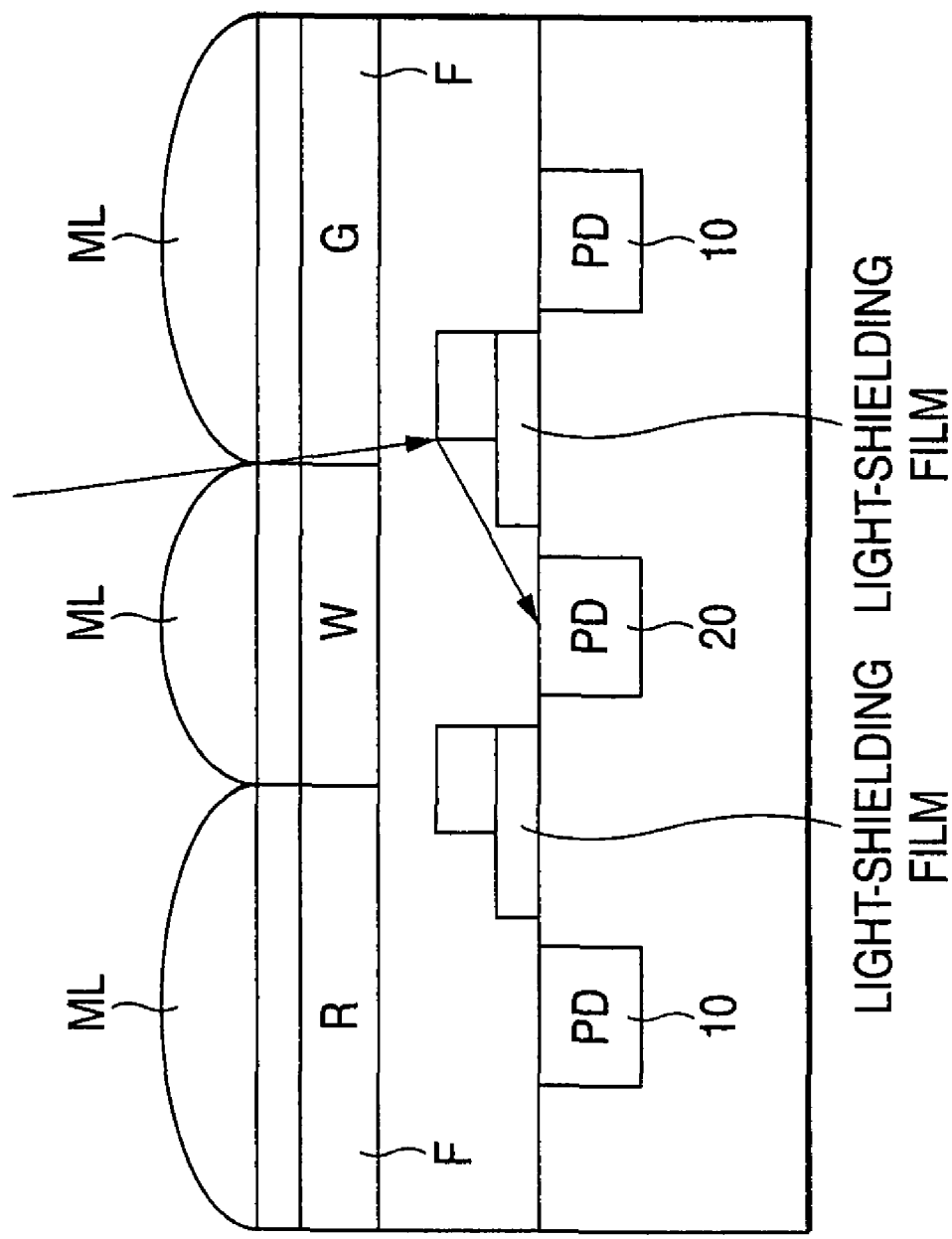
FIG. 3 is a schematic cross-sectional view illustrating a variation of the solid state imaging device shown in FIG. 1.

For obtaining the detect sensitivity of the high sensitivity PDs 20 and the detect sensitivity of the low sensitivity PDs 10 of an approximately same level (for minimizing the difference of the two), a following method is conceivable in addition to the aforementioned known methods. At first the low sensitivity PDs 10 and the high sensitivity PDs 20 are formed with a same structure, whereby the difference of the two in the detect sensitivity is made solely dependent on the difference in the optical attenuation rate between the spectral filter and the luminance filter. Then, as illustrated in FIG. 3, a spectral filter F and a microlens ML provided upwardly of the low sensitivity PD 10 are made larger than a luminance filter W and a microlens ML provided upwardly of the high sensitivity PD 20 to increase the detect sensitivity of the low sensitivity PD 10, thereby approximately matching the detect sensitivities of the two. In the structure illustrated in FIG. 3, even in the case that a light passing through the spectral filter F leaks to the high sensitivity PD 20, little influence is caused on the color reproduction since the high sensitivity PD 20 is an element detecting the luminance. It is therefore possible to simplify the signal reading process and the signal processing while maintaining the color reproducibility, by setting a same detect sensitivity for the low sensitivity PDs 10 and the high sensitivity PDs 20: Also in the structure illustrated in FIG. 3, the color reproducibility is not affected even when the spectral filter F may be made to stick out to a position overlapping with the microlens ML provided upwardly of the high sensitivity PD 20, so that the alignment margin for the spectral filter may be made wider and the production cost may also be reduced.

Next, description will be given below of an image pickup apparatus using the solid state imaging device shown in FIG. 1 with reference to FIG. 4. As regards the image pickup apparatus shown in FIG. 4, there is imagined a digital camera which incorporates therein an optical system having an automatic focusing (AF) mechanism.

The image pickup apparatus shown in FIG. 4 includes a solid state imaging device 100 having the same structure as the solid state imaging device shown in FIG. 1, a taking lens 110 disposed in front of the solid state imaging device 100, a drive part 120 for driving the solid state imaging device 100, a lens drive part 130 for driving the taking lens 110, a control part 140, and an operation part 150.

The structure and operation of the solid state imaging device 100 are the same as described above. The light, which enters the image pickup apparatus from a subject to be photographed, is collected by the taking lens 110 to form an optical image on the surface of the solid state imaging device 100. The taking lens 110 includes a lens movable in the thickness direction of the solid state imaging device 100; and, by changing the position of this lens, the focal position can be adjusted.

The drive part 120 is composed of an electric circuit which reads the electric charges from the respective PDs 10, 20 contained in the solid state imaging device 100 and generates various pulse signals for transferring the electric charges in the row and column directions on the solid state imaging device 100. The lens drive part 130 is composed of an electric motor for moving the movable lens included in the taking lens 110 and an electric circuit for driving the electric motor.

The control part 140 is composed of an electric circuit which is used to generally control the whole of the image pickup apparatus. Specifically, the control part 140, in accordance with an instruction from the operation part 150 including a shutter button for operating the image pickup apparatus, controls the drive part 120 and lens drive part 130, and further processes a signal which is output from the solid state imaging device 100.

The drive part 120, lens drive part 130 and control part 140 cooperate together in constituting a focusing section as set forth in the claims.

The outline of the processing on the AF (automatic focusing) operation in the image pickup apparatus shown in FIG. 4 is as follows.

Step S1: When the shutter button is depressed by a user, an AF start instruction is generated in the interior of the control part 140.

Step S2: According to the AF start instruction, the control part 140 starts photographing for the AF operation. That is, the control part 140 controls the lens drive part 130 to move the movable lens included in the taking lens 110 and, at every moving position of the movable lens, controls the drive part 120 in an AF mode to execute photographing using the solid state imaging device.

Step S3: On receiving a photographing instruction of the AF mode from the control part 140, the drive part 120 drives the solid state imaging device 100 so as to read a signal related to only the high sensitivity PDs 20 of the above-mentioned low and high sensitivity PDs 10 and 20. Specifically, after end of an exposure period, by superimposing a read pulse only on the third phase pulse (the vertical transfer pulse to be applied to the terminal 113), the solid state imaging device 100 is driven to read a signal only from the high sensitivity PDs 20.

Step S4: According to the signal obtained from the solid state imaging device 100 by photographing at the respective moving positions of the movable lens included in the taking lens 110, the control part 140 decides the focused position.

Step S5: The control part 140 controls the lens drive part 130 to move the movable lens included in the taking lens 110 to the thus decided focused position, whereby the movable lens included in the taking lens 110 is moved to the focused position, which completes the AF operation.

In the above-mentioned AF operation, when the photographing for focusing is executed by the solid-state imaging device 100, the photographing is carried out using only the high sensitivity PDs 20 and the reading operation from the low sensitivity PDs 10 is omitted, thereby being able to complete the photographing in a short time and thus execute the AF processing at an enhanced speed. Also, since the high sensitivity PDs 20 are enhanced in sensitivity, it is possible to photograph a clear image even in a dark environment and an out-of-focus phenomenon is hard to occur. In order to reproduce a color image, it is necessary to detect the color components "R", "G", "B" and the like respectively. However, in the case of the photographing for the AF operation, since the spatial frequency and the like included in the image can be detected provided that there exists a luminance component, information about the color components is not necessary.

As regards the arrangement pattern of the three kinds of spectral filters to be provided upwardly of the low sensitivity PDs 10, there may be employed a desired pattern according to cases. At the present, by using such Bayer arrangement as shown in FIG. 2, the highest quality color image can be reproduced. Also, as the spectral filters to be provided upwardly of the low sensitivity PDs 10, there may also be used spectral filters of a complementary color system, or four or more kinds of spectral filters which respectively transmit different colors. In the case of utilizing spectral filter of 3 kinds as the spectral filter, a satisfactory color reproducibility can be secured by adopting a proportion of 2:1:1 in the spectral filters of 3 kinds, as in the Bayer arrangement.

The present invention enables to provide a solid state imaging device that can achieve an improvement in the color reproducibility, an improvement in the sensitivity and a broadening in the dynamic range.

The entire disclosure of each and every foreign patent application from which the benefit of foreign priority has been claimed in the present application is incorporated herein by reference, as if fully set forth.

What is claimed is:

1. An image pickup apparatus, comprising:
   a solid state imaging device, including:
   a semiconductor substrate; and
   a plurality of photoelectric conversion elements arranged on the semiconductor substrate in a row direction and a column direction substantially perpendicular to the row direction,
   wherein said plurality of photoelectric conversion elements are divided into low-sensitivity photodiodes and high-sensitivity photodiodes,
   the high-sensitivity photodiodes have positions considered as reference positions,
   the low-sensitivity photodiodes are disposed at positions shifted in a given direction from the reference positions in such a manner that each of the low-sensitivity photodiodes adjoins at least one of the high-sensitivity photodiodes,
   three kinds of spectral filters are respectively provided upwardly of light receiving surfaces of the low-sensitivity photodiodes, the three kinds of spectral filters respectively transmitting different color components and being provided in a proportion of 2:1:1,
   luminance filters are respectively provided upwardly of light receiving surfaces of the high-sensitivity photodiodes, the luminance filters each having a spectral characteristic correlated with luminance component of the light, and
   the low-sensitivity photodiodes have a same lattice-like arrangement pattern as the high-sensitivity photodiodes and wherein the low-sensitivity photodiodes have a detect sensitivity lower than that of the high-sensitivity photodiodes,
   wherein signals are read independently from each of the low-sensitivity photodiodes and the high-sensitivity photodiodes;
   a movable lens disposed in front of the solid state imaging device; and
   a focusing section that adjusts a focal position of the lens according to a signal from the solid state imaging device,
   wherein the focusing section, when it is driven by the solid state imaging device in order to adjust the focal position, reads a signal only from the respective high-sensitivity photodiodes disposed in the solid state imaging device.

2. An image pickup apparatus as set forth in claim 1, wherein the three kinds of spectral filters comprises spectral filters respectively transmitting a red light, spectral filters respectively transmitting a green light and spectral filters respectively transmitting a blue light, and the three kinds of spectral filters are arranged in the Bayer arrangement manner.

3. An image pickup apparatus as set forth in claim 1, and wherein light attenuation of the luminance filter is less than light attenuation of the spectral filter.

* * * * *